M. A. LACEY.
HAY AND GRAIN STACKING FRAME.
APPLICATION FILED JUNE 26, 1915.
1,333,497.
Patented Mar. 9, 1920.
2 SHEETS—SHEET 1.
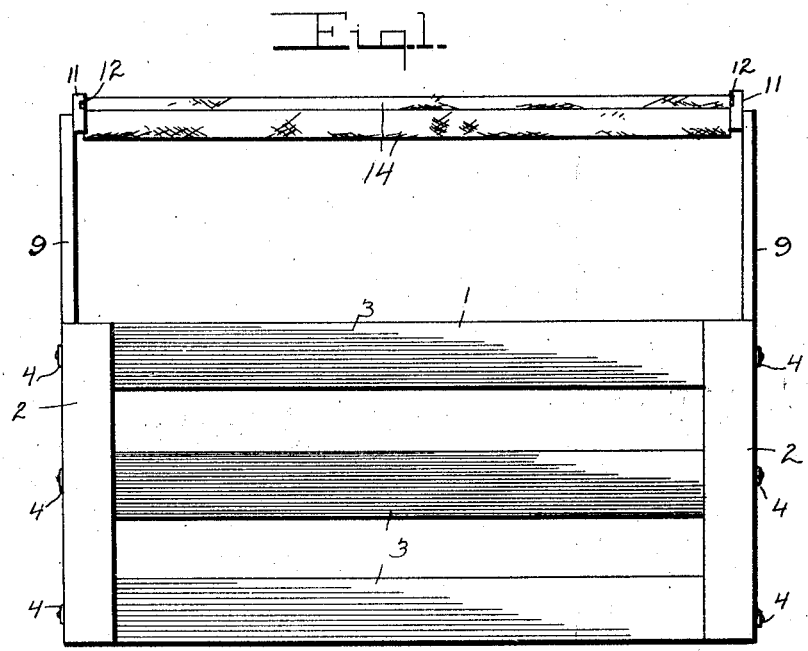
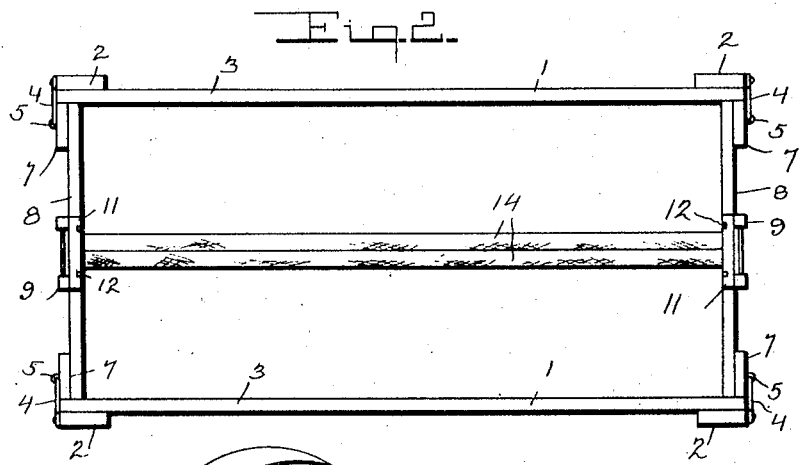
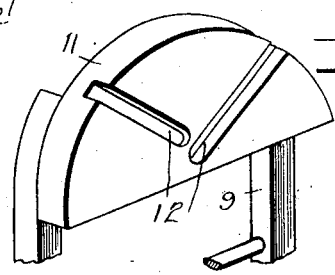
Inventor
M. A. Lacey

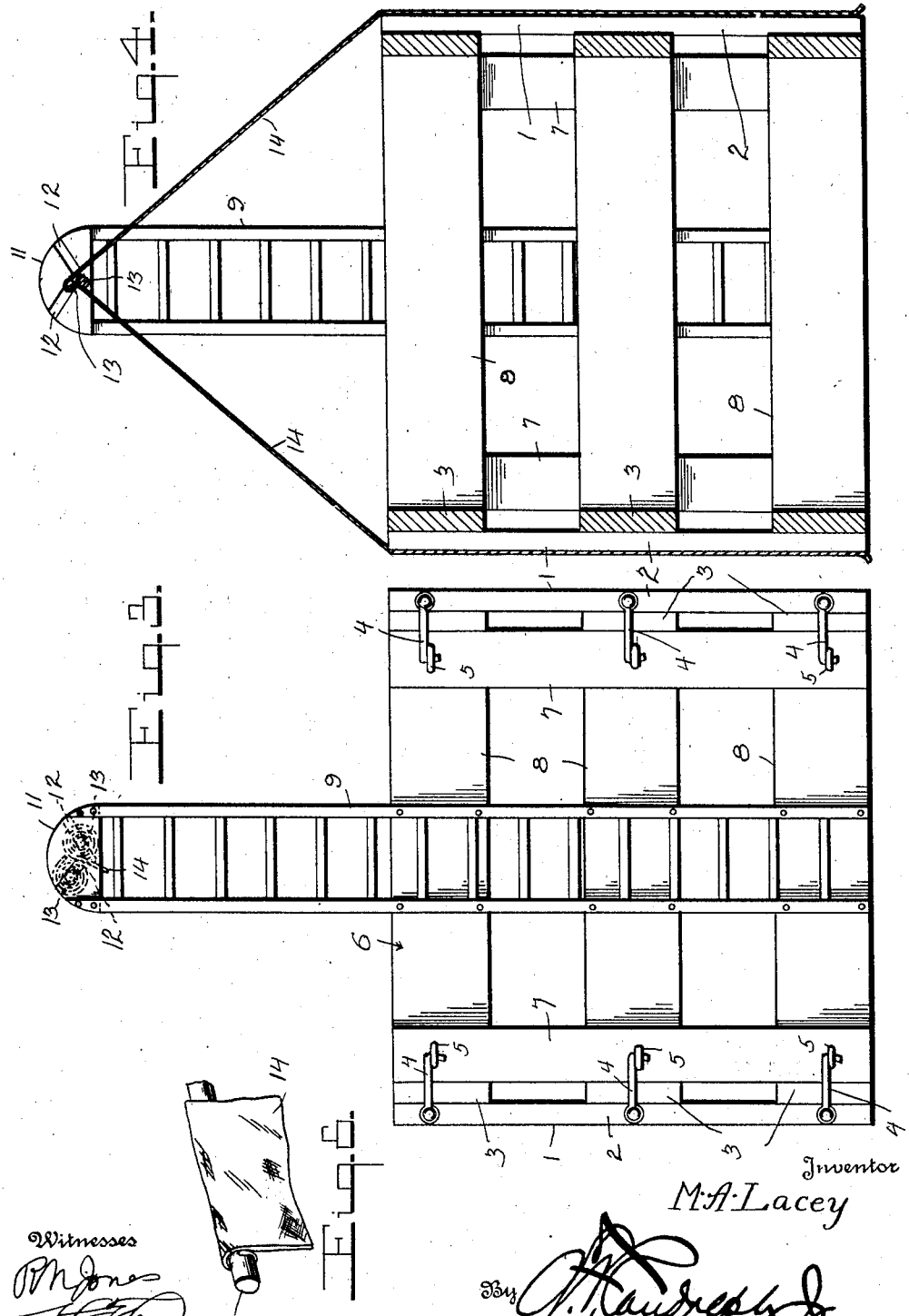

UNITED STATES PATENT OFFICE.

MILTON A. LACEY, OF BATH, ILLINOIS.

HAY AND GRAIN STACKING FRAME.

1,333,497.     Specification of Letters Patent.     Patented Mar. 9, 1920.

Application filed June 26, 1915. Serial No. 36,445.

*To all whom it may concern:*

Be it known that I, MILTON A. LACEY, a citizen of the United States, residing at Bath, in the county of Mason and State of Illinois, have invented certain new and useful Improvements in Hay and Grain Stacking Frames; and I do hereby declare the following to be a full, clear, and exact description of the invention, such as will enable other skilled in the art to which it appertains to make and use the same.

The invention relates to improvements in hay and grain stacking frames.

The object of the present invention is to improve the construction of hay and grain stacking frames and to provide a simple, practical and inexpensive stacking frame adapted to be easily and quickly set up in position for use, in a field and capable of being readily removed when the stack is completed and of preventing great waste of hay and grain.

A further object of the invention is to provide a stacking frame of this character adapted to afford ready access to its interior to enable the hay or grain to be tramped as compactly as desired and equipped with means for protecting it from the weather to prevent the hay or grain from being wet before the top of the stack is finished.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction may be resorted to without departing from the spirit or sacrificing any of the advantages of the invention.

In the drawings—

Figure 1 is a side elevation of a hay and grain stacking frame constructed in accordance with this invention, the covers being rolled up.

Fig. 2 is a plan view of the same.

Fig. 3 is an end elevation of the hay and grain stacking frame.

Fig. 4 is a transverse sectional view, the covers being unrolled and in position for protecting the hay or grain.

Fig. 5 is an enlarged detail perspective view of one of the segmental heads of the ladders.

Fig. 6 is a detail view of a portion of one of the rollers and its cover.

Like numerals of reference designate corresponding parts in all the figures of the drawings.

In the accompanying drawing in which is illustrated the preferred embodiment of the invention, 1—1 designates side walls or members preferably composed of end posts or bars 2 and horizontal connecting rails 3, arranged at intervals and suitably secured at their ends to the posts 2. The end posts or vertical bars 2 are provided with horizontally projecting hooks 4 having downwardly extending bills adapted to engage staples 5 of end walls or members 6 composed of vertical bars or posts 7 and horizontal connecting rails or bars 8 suitably secured to the posts or bars 7. The side walls or members and the end walls or members form an oblong inclosure and in practice the side walls or members will be 22 ft. long and 10 ft. high while the end walls or members will be 10 ft. square, but the stacking frame may be made of any desired dimensions as will be readily understood. Also instead of employing the hooks and staples or eyes any other suitable means may be employed for detachably interlocking the side and end walls or members with each other.

The end walls or members are equipped at their centers with vertical ladders 9 of any preferred construction extending above the top rails of the end walls or members and provided at their upper ends with substantially segmental heads 11. The ladders are preferably about 16 ft. in length but they may be made of any length and the segmental heads which consist of plates or blocks are provided with oppositely inclined bearing slots 12 adapted to receive the ends of rollers 13. The slots which form bearings, terminate at their lower ends at points in substantially the same vertical plane so that the rollers are located one above the other and the said rollers are provided with covers 14 of canvas or other suitable material adapted to be unrolled from the rollers and drawn down over the top and sides of the stacking frame to protect the hay or grain from the weather to prevent the same from being wet before the top of the stack is finished.

The flexible covers extend in the opposite direction from the entrance at the top so that the weight of the rollers and the covers serve to retain the former in the bearing slots or recesses. In placing the rollers in the recesses, one man mounts each of the ladders and places his end of the rollers in the bearing slots. The arrangement of the rollers one above the other closes the space between the rollers so that the covers which will assume an inclined position before the stack is completed will shed water and prevent the same from wetting the hay or grain.

When the stack is completed the side walls or members are readily disconnected and removed from around the hay or grain.

What is claimed is:—

In a device of the class described, a frame, upwardly extending supporting members carried by the opposite ends of the frame, the upper terminals of the supports having grooves in their inner faces, upper and lower rollers extending between the supports and mounted in the grooves, and covers carried by the rollers, the grooves being inclined and extending downwardly and inwardly from the edges of the supports and terminating at spaced points at their lower ends in substantially the same vertical plane, whereby the rollers are normally held in engagement with each other by gravity, as and for the purpose specified.

In testimony whereof I affix my signature in presence of two witnesses.

MILTON A. LACEY.

Witnesses:
MOSES MORRIS,
LAWRENCE B. TRAVERS.